Oct. 2, 1945.    W. H. SILVER    2,385,950
CULTIVATOR
Filed March 28, 1942    3 Sheets-Sheet 1
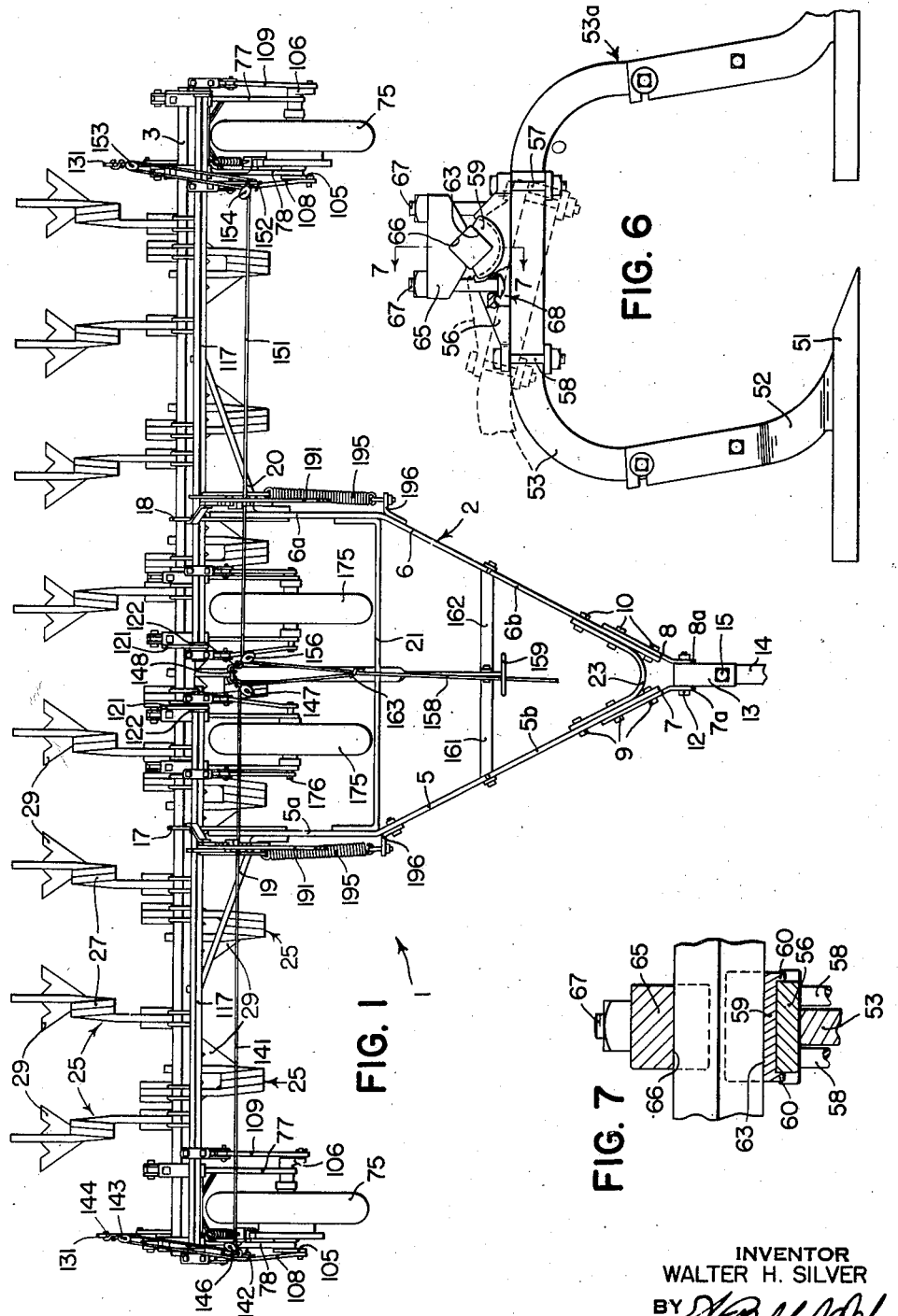
INVENTOR
WALTER H. SILVER
ATTORNEYS Oct. 2, 1945.  W. H. SILVER  2,385,950
CULTIVATOR
Filed March 28, 1942  3 Sheets-Sheet 2
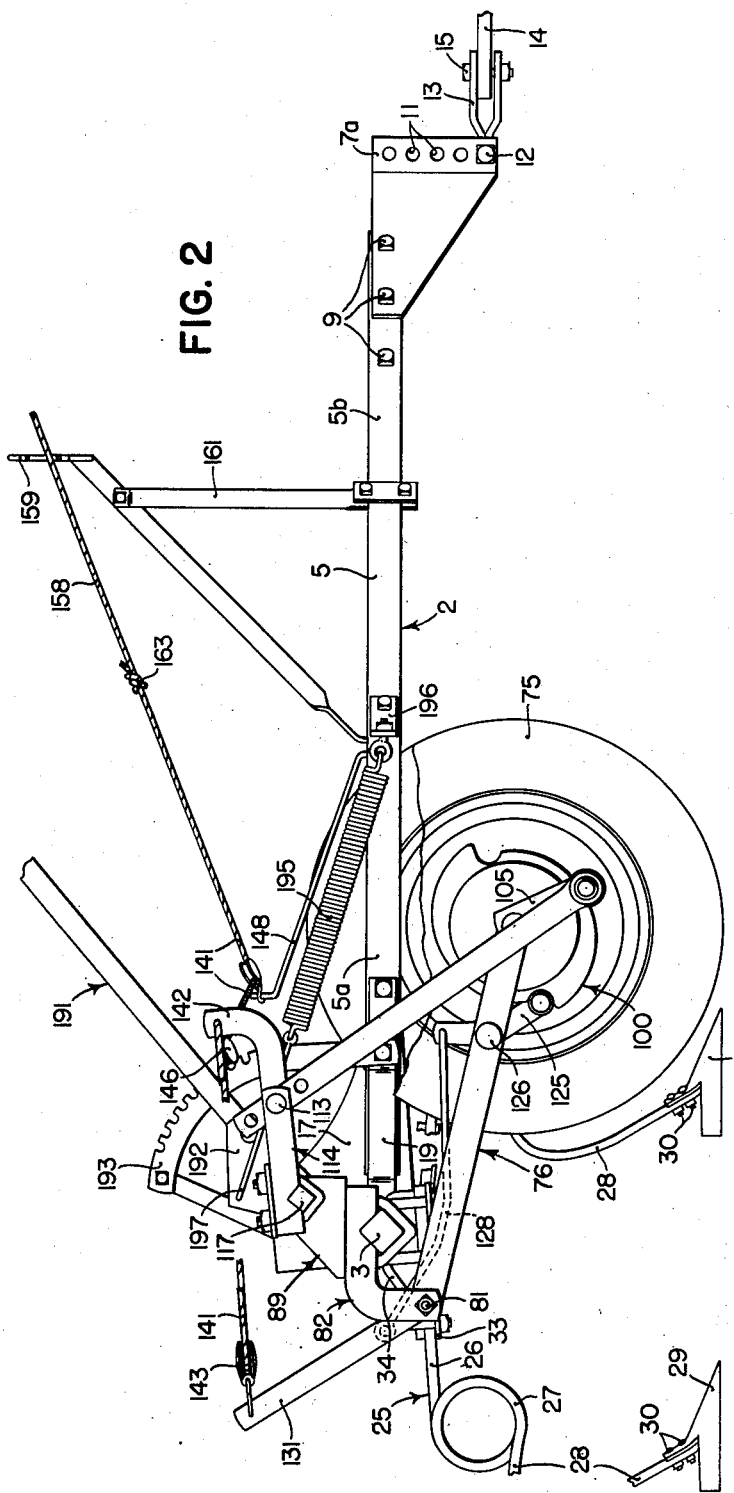
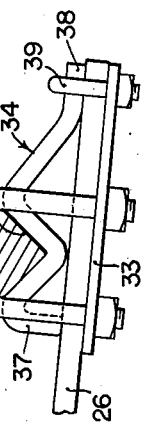
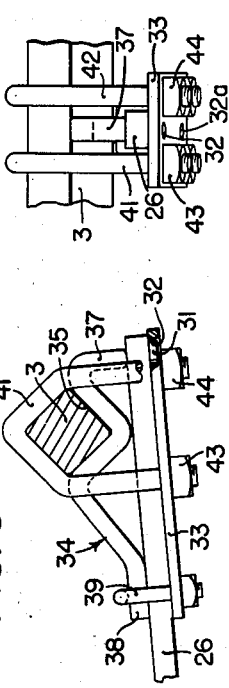
INVENTOR
WALTER H. SILVER
BY
ATTORNEYS Oct. 2, 1945.  W. H. SILVER  2,385,950
CULTIVATOR
Filed March 28, 1942  3 Sheets-Sheet 3
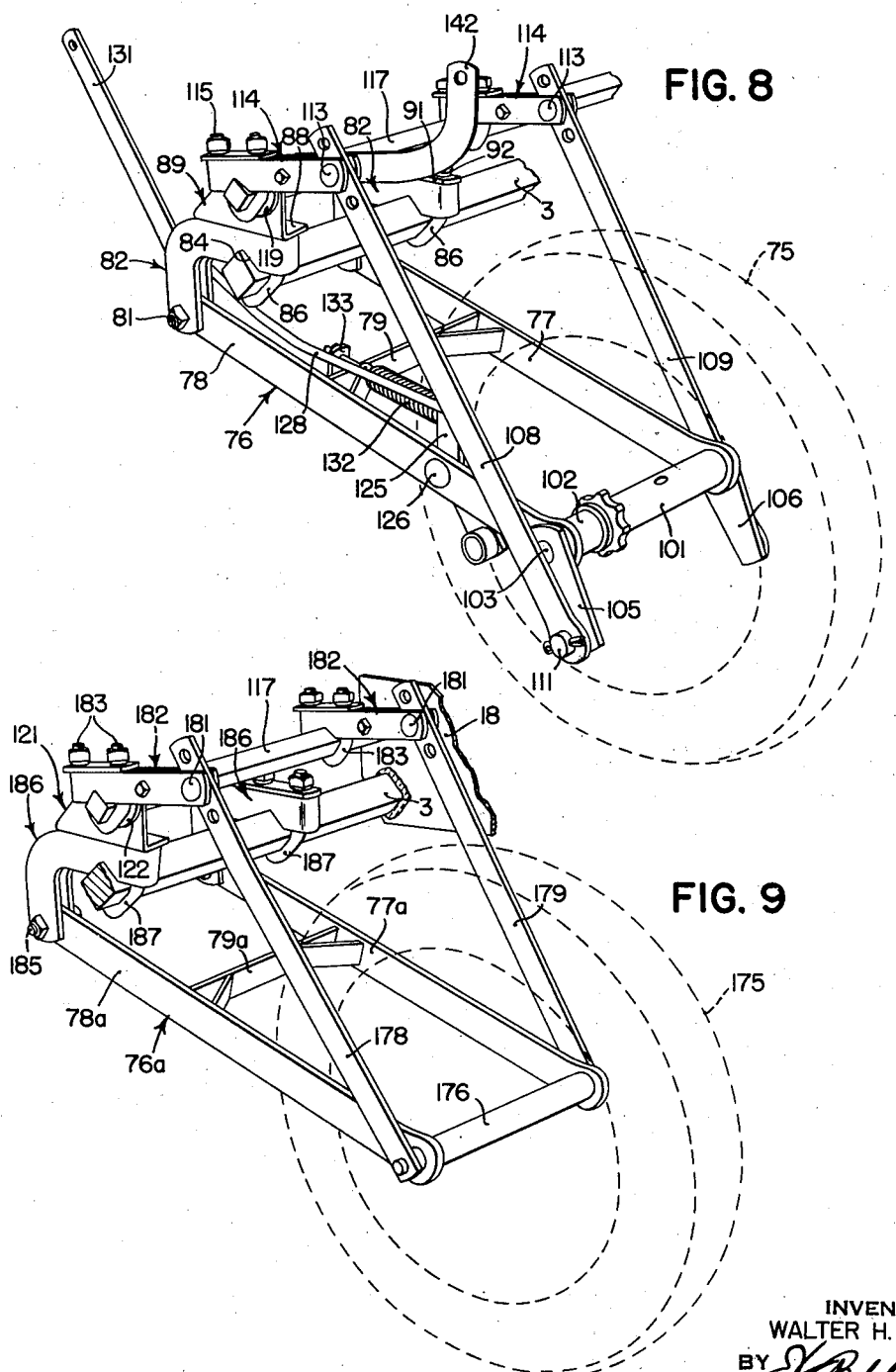
INVENTOR
WALTER H. SILVER
BY
ATTORNEYS Patented Oct. 2, 1945

2,385,950

UNITED STATES PATENT OFFICE 2,385,950

CULTIVATOR

Walter H. Silver, Moline, Ill., assignor to Deere & Company, Moline, Ill., a corporation of Illinois Application March 28, 1942, Serial No. 436,708

16 Claims. (Cl. 97—73)

This invention relates generally to agricultural implements and more particularly to soil working tillage implements particularly adapted for the preparation of seed beds, sub-surface cultivation, summer fallow work and other uses.

The object and general nature of the present invention is the provision of a soil working machine of the pull-type incorporating new and improved lifting and gauging equipment.

More specifically, one feature of the present invention lies in the provision of improved means connecting the swingable ground wheels with the tool bar of the implement frame whereby eccentric and torsional loads on the parts are eliminated. It is also a feature of this invention to provide a pair of gauge wheels and a pair of lifting wheels, which also serve as gauge wheels in their operating position but which are adapted, through power lift clutches, to raise both the implement frame and the other ground wheels into a transport position. It is also a feature of this invention to provide improved means controlling the power lift clutches and operating normally to engage or disengage the clutches simultaneously, the control means being so constructed, however, that no parts will be damaged in the event that one clutch fails to engage or disengage with the other clutch.

Still further, another feature of this invention is the provision of improved connecting means between the tool bar of the implement frame and the ground working tools. The tool bar is adapted to receive a number of different tools, such as spring teeth or sweeps or the like connected through stiff shanks to the tool bar. According to the present invention, means is provided in the former instance for allowing a certain amount of flexibility in the connection between each spring tooth and the tool bar, and in the latter instance, means is provided for adjusting the position of each tool shank relative to the other shanks.

These and other objects and advantages of the present invention will be apparent to those skilled in the art after a consideration of the following description, taken in conjunction with the accompanying drawings in which the preferred form of the invention has ben illustrated.

In the drawings:

Figure 1 is a plan view of a tool bar cultivator in which the principles of the present invention have been incorporated;

Figure 2 is a side view at an enlarged scale of the implement shown in Figure 1;

Figure 3 is an enlarged sectional view taken generally through the tool bar adjacent one of the spring tools, showing the preferred mounting for a spring tooth tool;

Figure 4 is an end view of the construction shown in Figure 3;

Figure 5 is a view similar to Figure 3 but showing certain parts in reversed position, whereby the position of the tool may be changed, as to accommodate a raised or lowered hitch point;

Figure 6 is a view showing an adjustable mounting for a stiff shank tool;

Figure 7 is a sectional view taken generally along the line 7—7 of Figure 6;

Figure 8 is a fragmentary perspective, illustrating the mounting for the lifting wheels, with which are asociated power lift clutches; and Figure 9 is a view similar to Figure 8 but showing the mounting for the gauge wheels.

Referring now to the drawings, more particularly Figures 1 and 2, the present invention has ben illustrated as embodied in a tool bar cultivator of the towed type and is indicated in its entirety by the reference numeral 1. The implement 1 comprises, in general, a laterally disposed frame which is made up of a forwardly extending hitch frame 2 and a transversely disposed tool bar 3 which is polygonal in cross section. The hitch frame 2 includes a pair of bars 5 and 6, the rear portions 5a and 6a of which extend in laterally spaced generally parallel relation while the forward portions 5b and 6b converge forwardly and receive a pair of hitch plates or clevis jaws 7 and 8, the latter parts being preferably secured to the bars 5 and 6 by bolts 9 and 10. The plates 7 and 8 are generally triangular in configuration (Figure 2) and have forward parallel portions 7a and 8a which are provided with a plurality of apertures 11 in which a draft bolt 12 may be placed in different positions. A draft clevis 13 is mounted on the bolt 12 and extends forwardly and is connected with the drawbar 14 of a tractor or other source of power, being connected thereto by a vertical bolt or pin 15. The rear ends of the hitch frame members 5 and 6 are secured, as by bolts or the like, to plates 17 and 18 that are welded in laterally spaced relation to the tool bar 3, as best shown in Figure 1. The tool bar 3 is reenforced by diagonal braces 19 and 20, and the hitch frame includes a cross bar 21 connecting the parallel portions 5a and 6a of the bars 5 and 6.

The tool bar 3 is adapted to receive cultivating tools of various kinds. For example, in Figure 1 I have shown the tool bar 3 as receiving a plurality of spring teeth connected with the tool bar 3 and each having a ground working sweep.

These tools and the manner in which they are adapted to be connected to the tool bar 3 will now be described. Each spring tooth is indicated by the reference numeral 25 and includes a forwardly extending attaching section 26, a coil spring section 27, and the downwardly extending tool receiving section 28. A sweep 29 is secured, as by bolts 30, to the lower end of the tool receiving section 28. The attaching section 26 of each spring tooth carries a boss 31 (Figure 3) at its forward end that is adapted to be received in an opening 32 formed in a plate 33. The latter is disposed beneath the tool bar 3 and also beneath the attaching section 26. Between the latter and the tool bar 3 a spring cushioning member 34 is placed. Where the tool bar 3 is square in cross section, the member 34 is provided with a central V-shaped section 35 adapted to fit against the under side of the tool bar 3. The member 34 has a downturned end 37 adapted to bear against the upper edge of the spring tooth section 26. The other end of the member 34 extends downwardly at an angle, terminating in a section 38 that extends along the attaching section 26 for a short distance. A U-bolt 39 serves to clamp the section 38 to the spring tooth section 26, the U-bolt 39 extending through apertures in the plate 33. The latter is provided with apertures in the central portion thereof to receive the ends of a pair of U-bolts 41 and 42 that embrace the tool bar 33 and extend downwardly on opposite sides of the spring member 34 and the attaching section 26 of the spring tooth 25. Each of the U-bolts, which serves as a clamping member, is formed to fit the upper side of the tool bar 3, as shown in Figures 3 and 4. Nuts 43 and 44 are disposed on the ends of the U-bolts 41 and 42 and serve to clamp the associated spring tooth to the tool bar 3 firmly and substantially rigidly except for the cushioning action that is provided by the member 34, as will be referred to below. The disposition of the boss 31 in the opening 32 of the plate 33 serves to prevent longitudinal displacement of the spring tooth relative to the plate 33 and the tool bar 3.

Another form of tool that may be attached to the tool bar 3 is the stiff shank sweep, and referring now to Figures 6 and 7, which show the attachment of one of such tools to the tool bar 3, the sweep is indicated by the reference numeral 51 and includes a standard 52 which is attachable to a sweep beam 53. A clamp casting 56 is secured, as by bolts 57 and 58, to the horizontal portion of the beam 53. One portion of the clamp casting 56 is formed as an arcuate section and is adapted to receive a saddle member 59 having side flanges 60. The outer or lower surface of the saddle member 59 is arcuate and is adapted to fit against the arcuate portion of the clamp casting 56 so as to provide for a certain amount of adjustment of the saddle member 59 about an axis that passes through the center of curvature of the arcuate portions. The upper or inner portion of the saddle member 59 is formed with a socket 63 to receive the lower portion of the tool bar 3. An upper clamp casting 65 having a socket 66 fitting against the upper portion of the tool bar 3 is connected by clamping bolts 67 to the lower clamp casting 56, the heads of the bolts 67 being loosely received, as at 68, by the casting 56. Thus, when the bolts 67 are tightened, the upper clamp casting 65 and the saddle member 59 are firmly and rigidly clamped to the tool bar 3, but when the bolts 67 are loosened, the tool may be adjusted relative to the tool bar 3, generally about the longitudinal axis of the latter. In Figure 6, I have shown the beam 53 as extending generally rearwardly with respect to the tool bar, but if desired another beam 53a, which is similar to the beam 53 but with its sweep-receiving section extended forwardly, may be mounted on the bar 3 in between adjacent beams 53, thus providing a staggered relation, similar to the arrangement of the sweeps in Figure 1.

As best shown in Figure 1, the implement frame, which includes the hitch frame 2 and the tool bar 3, is relatively wide so as to accommodate a considerable number of tools, as shown. In a construction of this kind, according to the principles of the present invention, a pair of power actuated lifting wheels are provided, preferably one at each side of the implement, and an auxiliary set of gauge wheels, preferably disposed in the central portion. All of these wheels are mounted for generally vertical swinging and controlled by means that may be used to adjust the operating depth of the tools. Referring first to the power actuated lifting wheels, each lifting ground wheel is indicated by the reference numeral 75 and is carried on a swinging member or crank axle 76 that includes a pair of bars 77 and 78 suitably connected together by a cross brace 79 and each of which is pivoted, as at 81, to the downwardly extending portion of a support arm 82. Each of the members 82 is formed as a U-shaped strap which is notched, as at 84, to fit against the upper part of the tool bar 3. A U-bolt 86 embraces the lower portion of the tool bar 3 and has its ends extending upwardly through the horizontal web 88 of an angle bracket 89. Nuts (not shown) are screwed onto the threaded upper ends of the U-bolt 86 and serve thereby to clamp the angle bracket member 89 and the support arm 82 in position. Each support arm 82 is clamped to the tool bar 3 by substantially the same means as just described, except that the support arm for the laterally inner bar 77 does not carry an angle bracket; instead, a strap 91 is disposed over the support arm 82 and the threaded ends of the associated U-bolt 86 extend through openings in the strap 91 and carry nuts 92, as best shown in Figure 8. The two support arms 82 to which the arms 77 and 78 are pivoted are disposed in laterally spaced apart relation so as to lie generally in the planes, respectively, of the arms 77 and 78.

Associated with the lifting wheel 75 is a power lift clutch mechanism 100 (Figure 2) substantially identical with the clutch mechanism shown in my co-pending application, Serial No. 391,918, filed May 5, 1941, for Improvements in clutch mechanism, now U. S. Patent 2,346,514, issued April 11, 1944, to which reference may be made if necessary. A part of the clutch mechanism is shown in Figure 8. Briefly, the wheel 75 is mounted in fixed relation on a sleeve member 101 that constitutes the driving member of the clutch. The sleeve 101 is rotatable on a member 102 that constitutes the driven member of the clutch, the member 102 being keyed to a shaft 103 that extends laterally outwardly through openings in the bars 77 and 78. A crank arm 105 is welded to one end of the shaft 103 and at the other side a companion crank arm 106 is keyed or otherwise fastened to the shaft 103. Links 108 and 109 are pivoted to pins 111 carried by the cranks 105 and 106, and at their upper ends each of the links 108 and 109 is connected by a pivot pin 113 to an arm 114 which is clamped by a U-bolt 115 to a square rock shaft 117. The rock shaft 117 is mounted at its outer end by suitable bearing means 119 in the vertical leg of the angle bracket 89. The inner end of the rock shaft 117, as best shown in Figure 1, is supported by an angle bracket 121 through suitable bearing means 122, the angle bracket 121 forming a part of the means connecting one of the gauge wheels to the tool bar at the central portion of the implement, as will be described below. The clutch mechanism associated with the wheel 75, of which mechanism the driving sleeve 101 and the driven sleeve 102 are parts, is controlled by a movable control part in the form of a trip arm 125 pivoted as at 126 to the bar 78. A link or connection 128 extends from the upper end of the trip arm 125 rearwardly to an operating member including a trip lever 131 which is mounted for pivotal movement on the inner end of the bolt 81 (Figure 8). A spring 132 is connected at one end to the trip arm 125 and at its other end is adjustably connected to a bracket 133 fixed to the cross bar 79.

The lifting wheel construction and the associated power lift mechanism at each end of the tool bar 3 is substantially as described above, and hence a description of only one of the power lift units is necessary, the same reference numerals being applied to identical parts at both sides of the machine, as in Figure 1.

For raising all of the tools simultaneously into raised position, it is desirable to engage both of the power lift clutch mechanisms, and according to the principles of the present invention this is done by means of a flexible connection with the trip lever 131 of each power lift unit. Referring now to Figure 1, a cable 141 is anchored at its outer end to a bracket 142 (Figure 8) that is carried by or forms a part of the associated adjusting arm 114. The cable 141 extends rearwardly from the bracket 142 and is trained through a pulley 143 that is connected by a hook 144 with the upper end of the associated trip lever 131. From thence the cable 141 is extended forwardly to a second pulley 146 carried by the bracket 142, and from the pulley 146, the cable 141 extends laterally inwardly and is passed through a pulley 147 supported at the upper end of an upwardly and rearwardly extending standard 148 carried by the hitch frame 2 in any suitable manner. A second cable 151 is anchored at its outer end to a bracket 152 and is passed through a pulley 153 carried at the upper end of the trip lever 131 of the other power lift unit and also through another pulley 154 that is carried on the bracket 152. The second cable then extends laterally inwardly and is passed through a pulley 156 that is supported on the standard 148. The two cables 141 and 151 are connected together forward of the two pulleys 147 and 156 and thence extend forwardly as a single member, indicated at 158, which member passes through a loop 159 supported by a pair of upwardly converging braces 161 and 162 carried by the hitch frame 2. By virtue of the flexible means that is employed for actuating both of the trip levers 131, there is no possibility of any of the parts being bent or twisted in the event that only one of the power lift clutches should be engaged. In some prior constructions of which I am aware, including two power lift clutches operated simultaneously, the two trip levers for the clutches are connected together by a rock shaft, and it has happened at times that the rock shaft becomes twisted and distorted if one power lift clutch should be engaged while the other remains disengaged. The reason for this is that whenever either power lift clutch is engaged, the crank arms 105 and 106 (Figure 8) are rotated through approximately a half revolution, reacting against the arms 114 to cause the swinging frame 76 to swing downwardly, relative to the implement frame, thus raising the latter. Such downward swinging movement of the member 76 acts through the link 128 to cause some movement of the clutch trip lever 131. It will be seen, therefore, that if the clutch trip lever of one clutch mechanism is connected rigidly across the machine with the other clutch trip lever, as by a transverse rock shaft, the inadvertent engagement of one clutch while the other clutch remains disengaged normally results in distorting or twisting the connecting rock shaft. As mentioned above, this disadvantage is eliminated by connecting both of the clutch trip levers 131 with flexible means, whereby if it should occur that one clutch should become engaged while the other remains disengaged, no harm to any part can result. The loop 159 is provided with a slot, and when the cable 158 is pulled to trip both clutches, the knot 163 that connects the various cables is slipped through the loop 159 and down into the slot so that during the action of the clutches it will not be necessary for the operator to retain his hold on the cable 158. Of course, when the implement is approaching its raised position, it will be necessary for the operator to pull the knot 163 from the slot and permit it to move rearwardly through the loop 159 back to the position shown in Figure 1.

The gauge wheels in the central portion of the machine are each indicated by the reference numeral 175, and as best shown in Figure 9, each of the gauge wheels 175 is mounted on an axle 176 that is carried at the outer end of a swinging member or crank 76a, preferably constructed substantially directly like the member 76 described above, the member 76a including a pair of laterally spaced bars 77a and 78a suitably braced by a member 79a. The wheel 175 rotates freely on the axle 176. The ends of the axle 176 are reduced in diameter to receive the lower forward ends of a pair of links 178 and 179, which are substantially the same as the links 108 and 109 described above, each link having a plurality of apertures to receive a pin 181 carried by an arm 182. Each arm consists of a U-shaped member notched to engage the laterally inner end of the rock shaft 117, and each arm is secured to the rock shaft 117 by a U-bolt 183. The laterally inner end of the rock shaft 117 is supported by the bearing 122 and the angle bracket 121 described above and shown in Figure 1. Each of the bars 77a and 78a is pivoted, as by a pivot bolt 185, to a support arm 186 that is clamped to the tool bar 3 by a U-bolt 187, the construction being substantially the same as that shown in Figure 8 and described above, so far as the connection of the member 76a to the tool bar 3 is concerned. The other gauge wheel 175 is connected swingably with the tool bar 3 by substantially the same means, and hence in Figure 1 the same reference numerals have been used.

The rock shafts 117 constitute adjusting means acting through the power lift wheels 75 and the gauge wheels 175 to determine the operating position of all of the tools connected to the tool bar 3. Each of the rock shafts 117 may be rocked by means of a hand lever 191 (Figure 2) that is fixed, as by riveting or otherwise, to a plate 192 that is welded or otherwise fastened to the rock shaft 117. A sector 193 is connected to the frame plate 17 in any suitable manner and is notched so as to cooperate with detent mechanism (not shown) carried by the associated hand lever 191. A counterbalancing spring 195 is connected at its forward end to a bracket 196 fixed to the hitch frame 2 and is connected by a link 197 to the plate 192.

The operation of the implement described above is substantially as follows.

The machine is hitched, as at 15, to the drawbar 14 of the tractor or some other source of power and the cable 158 pulled so as to cause the power lift units to lower the tools into operating position, the parts taking the positions shown in Figures 2, 8 and 9. The depth of operation of the tools may be adjusted by unlatching either or both of the hand levers 191 and rocking the associated rock shafts 117 in one direction or the other. It will be noted from Figure 1 that the power lift controlling arms 114 and the gauge wheel arms 182 are fixed to the same rock shaft, and therefore when raising or lowering the operating position of the tools, all of the arms 114 and 182 are rocked simultaneously, thus raising or lowering the frame relative to both the power lift wheels 75 and the gauge wheels 175. The tools at one side of the machine may be raised and lowered independently of the other tools by swinging only one of the hand levers 191. Thus, even though the machine is quite wide, the provision of means for adjusting the depth by acting against both the power lift wheels and the gauge wheels provides an accurate depth adjustment. When it is desired to raise the tools into their inoperative or transport position, the hand levers 191 are left in their locked position, which holds the two rock shafts 117 against rocking movement, and the cable 158 is pulled so as to actuate the power lift clutches associated with the lifting wheels 75. The rotation of the cranks 105, 106 reacts through the links 108 and 109 against the arms 114, which are fastened to the rock shaft 117, and the reaction results in exerting an upward thrust through the arms 114 against the implement frame, raising the same. The cranks 105, 106 swing through substantially a half revolution and then are automatically locked in that position, the associated swinging frames 76 swinging about the axes defined by the pivot members 81. It will be noted that only the two outer lifting wheels 75 are active when raising the implement into its transport position, the gauge wheels 175 being lifted with the implement since they are held in locked position by the latched hand levers 191. When it is again desired to lower the tools into operating position, all that the operator has to do is to again pull on the cable 158, which actuates both clutches and permits the tools to lower, the cranks 105, 106 swinging down into their operating position as shown in Figure 8.

It will be noted from Figures 3 and 5 that the cushioning member 34 and the associated plate 33 may be disposed in either of two positions. It will also be seen that the notch 35 is so formed that in one position the tool is disposed at a slightly different angle as compared with the position of the tool when the plate 33 and cushioning member 34 are reversed. The end of the plate 33 adjacent the U-bolt 39 is provided centrally with an opening 32a (Figure 4) to receive the lug 31 (Figure 3) when the parts are arranged as shown in Figure 5. This construction, in which the parts 33 and 34 may be reversed (Figures 3 and 5) to dispose the tool bars 26 at slightly different angles relative to the tool bar 3, makes it possible to adjust the implement for different heights of hitch points or other conditions. Similarly, the position of the tools may be varied, when the construction shown in Figures 6 and 7 is employed, by loosening the clamping bolts 67 and shifting the tools angularly about the tool bar 3.

In Figures 6 and 7 the tools are clamped rigidly to the tool bar 3, but in Figures 3 and 5, a limited amount of cushioned action is provided for. This action is substantially as follows. The soil pressure against the tool 25 (Figure 2) tends to cause the plate 33 and spring 34 to move in a clockwise direction about the tool bar 3. As understood, this action takes place more or less about the forwardmost edge of the tool bar at an axis, which results in springing the central portion of the part 34 downwardly and at the same time tending to shift the spring 34 generally longitudinally along the spring tooth section 26. The amount of yield is, of course, slight but in practice has proven sufficient to eliminate breakage of the spring tooth sections 26 adjacent the point where they are clamped in place.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. An agricultural machine comprising a relatively wide frame, tool means thereon, a pair of gauge wheels adjustably connected with said frame, one at each side of the longitudinal center line of said frame, a separate pair of lifting wheels connected with said frame for movement between working and transport position, one of said lifting wheels being disposed at each side of the longitudinal center line of said frame, means for simultaneously adjusting all of said wheels at each side of the longitudinal axis of said frame to vary the operating position of said tool means, and means acting against only said lifting wheels for raising said frame.

2. An agricultural implement comprising a relatively wide frame, a crank axle adjacent each end of the frame swingably connected therewith, a pair of crank axles swingably connected with the intermediate portion of said frame, said end crank axles being movable independently of said intermediate crank axles, adjusting means for all of said crank axles, ground wheels journaled on said crank axles, and power lift mechanism reacting against said adjusting means and associated with the two laterally outer ground wheels for swinging the associated crank axles downwardly, relative to the frame and the intermediate crank axles, thereby raising the frame into a transport position, said adjusting means serving to cause said intermediate crank axles and the associated ground wheels to be raised with said frame by the downward swinging of said end crank axles.

3. An agricultural implement of the tool bar type, comprising a transverse tool bar, a pair of swinging members connected to the end portions of said tool bar for independent movement, ground wheels journaled on the ends of said swinging members, respectively, a power lift clutch of the half-revolution type actuated by each ground wheel, a second pair of swinging members movably connected with said tool bar laterally inwardly of said first mentioned swinging members, gauge wheels journaled on the ends of said second pair of swinging members, adjusting means extending along said tool bar and adapted to be fixed to the latter in various positions of adjustment, and means connecting said gauge wheels and said power lift clutches with said adjusting means, whereby actuation of the latter adjusts all of said wheels when said power lift clutches are in operating position and movement of said power lift clutches to their transport position serving to raise said tool bar and said gauge wheels.

4. An agricultural implement of the tool bar type, comprising a transverse tool bar, a pair of swingable crank axles adapted to be connected to the end portions of said tool bar for independent movement, a clamping member rockably receiving the crank axle associated therewith and adapted to be fixed to said tool bar, there being one clamping member at each end portion thereof, a ground wheel journaled on each crank axle, a pair of centrally disposed crank axles, a clamping member for each of said centrally disposed crank axles for rockably connecting the latter with the central portion of said tool bar, a rock shaft mounted for rocking movement on the two clamping members at each side of the implement, means adjustably fixing said rock shaft in position, a ground wheel journaled on each of said central portions, means connecting each pair of crank axles with the associated rock shaft, whereby rocking of the latter serves to raise and lower the tool bar, power lift mechanism driven from the two laterally outer ground wheels, and means connecting the power lift mechanisms with said rock shaft whereby actuation of said power lift mechanisms serves to raise said tool bar and said central ground wheels.

5. An agricultural implement of the tool bar type, comprising a transverse tool bar, a draft frame connected to the tool bar, a pair of clamping members connected with said tool bar, a swinging member comprising a pair of bars, each pivoted at one end to one of said clamping members, a pair of rock shaft supports on said clamping members, a rock shaft supported thereon, a ground wheel journaled between said swinging bars, a pair of arms fixed to said rock shaft and substantially disposed, respectively, in the planes of said bars, a power lift clutch driven from said wheel and including a shaft journaled in the ends of said bars, a crank at each end of said shaft, and a link connecting each crank with the associated arm.

6. An agricultural implement of the tool bar type, comprising a transverse tool bar, a draft frame connected to the tool bar, a pair of clamping members connected with said tool bar, a swinging member comprising a pair of bars, each pivoted at one end to one of said clamping members, a pair of rock shaft supports on said clamping members, a rock shaft supported thereon, an axle carried by said swingable bars, a pair of arms fixed to said rock shaft and substantially disposed, respectively, in the planes of said bars, and means including a link connecting each arm with the associated end of said axle.

7. An agricultural implement of the tool bar type, comprising a transverse tool bar, a draft frame connected to the tool bar, a pair of clamping members connected with and slidable longitudinally of said tool bar, a swinging member comprising a pair of bars, each pivoted at one end to one of said clamping members, a pair of rock shaft supports on said clamping members, a rock shaft supported thereon, said supports being slidable longitudinally of said shaft, a pair of arms slidable longitudinally along said rock shaft and substantially disposed, respectively, in the planes of said bars, and means including a link connecting each arm with the associated swingable bar, loosening said arms on said rock shaft and said clamping members on said tool bar providing for lateral adjustment of said swinging member, arms and ground wheel relative to said tool bar.

8. An agricultural implement comprising a frame, a member movable relative to said frame, an axle journaled on said member and having a pair of cranks, a ground wheel on said axle, partial-revolution clutch means for optionally driving both of said cranks, and a pair of connections between said cranks and said frame, whereby actuation of said clutch means swings said member relative to said frame with said connections under substantially uniform loading.

9. An agricultural implement comprising a frame, a member movable relative to said frame, an axle journaled on said member and having a pair of cranks, a ground wheel on said axle, partial-revolution clutch means for optionally driving both of said cranks, a rock shaft on said frame, a pair of arms fixed to said rock shaft in a laterally spaced relation corresponding to the spacing between said pair of cranks, and a pair of connections between said cranks and said arms, whereby actuation of said clutch means acts through said connections and arms for swinging said member relative to said frame with said connections under substantially uniform loading.

10. An agricultural implement comprising a support, a swingable crank axle, a power lift clutch carried at the swinging end of the crank axle and including a crank and a movable control part connected with said support whereby rocking of said crank serves to rock said crank axle relative to said support, an operating member movably mounted on said support for movement about the axis of swinging of said crank axle, and a connection between said part and said operating member and connected to the latter adjacent but spaced from the axis of swinging of said crank axle.

11. An agricultural implement of the tool bar type, comprising a transverse tool bar, a draft frame connected to the tool bar, a pair of clamping members fixed to said tool bar in spaced apart relation, each of said clamping members including a generally L-shaped part having a horizontal portion fixed to the tool bar and a downwardly extending portion, a swinging member comprising a pair of bars, each pivoted at one end to the downwardly extending portion of one of said clamping members, and a ground wheel journaled between said swinging bars.

12. A tool bar implement comprising a transverse tool bar, a hitch frame rigidly connected at its rear end to the central portion of said tool bar with the latter extending laterally outwardly beyond the sides of said hitch frame, the latter including laterally spaced apart sections, and means including a pair of upright apertured plates connecting said sections fixedly to said bar, swingable ground wheel carrying parts, brackets having vertical apertured portions pivotally connecting said swingable parts to the outer end portions of said tool bar, a pair of rockshafts, one at each side of the implement and each rockably mounted at its outer end in the apertured portion of the associated bracket and at its inner end in the associated apertured hitch frame connecting plate, means connecting the outer end of each rockshaft to the associated swingable ground wheel carrying part, and means for rocking said rockshafts.

13. The invention set forth in claim 12, further characterized by said rocking means comprising a pair of levers fixed to the inner end portions of said rockshafts substantially in the plane of the adjacent hitch frame sections.

14. An agricultural implement of the tool bar type, comprising a transverse tool bar, a pair of swingable crank axles adapted to be connected to the end portions of said tool bar for independent movement, a clamping member rockably receiving the crank axle associated therewith and adapted to be fixed to said tool bar, there being one clamping member at each end portion thereof, a ground wheel journaled on each crank axle, a pair of centrally disposed crank axles, a clamping member for each of said centrally disposed crank axles for rockably connecting the latter with the central portion of said tool bar, a rockshaft mounted for rocking movement on one of the two clamping members at the ends of the tool bar and on one of the centrally disposed clamping members, a second rockshaft mounted for rocking movement on the other of the two end clamping members and on the other of the centrally disposed clamping members, and means connecting each rockshaft with said crank axles.

15. An agricultural implement of the tool bar type, comprising a transverse tool bar, a swinging member comprising a pair of bars, means pivotally connecting one end of each of said swingable bars to said tool bar, a rockshaft carried by said tool bar, a ground wheel journaled between said swinging bars, a pair of arms fixed to said rockshaft and substantially disposed, respectively, in the planes of said swingable bars, a power lift clutch driven from said wheel and including a shaft journaled in the ends of said bars, a crank at each end of said shaft, and a link connecting each crank with the associated arm.

16. An agricultural implement of the tool bar type, comprising a transverse tool bar, a draft frame connected to the tool bar, a swinging member comprising a pair of bars, means pivotally connecting one end of each of said swingable bars to said tool bar, a rockshaft carried by said tool bar, an axle carried by said swingable bars, a pair of arms fixed to said rockshaft and substantially disposed, respectively, in the planes of said bars, and means including a link connecting each arm with the associated end of said axle.

WALTER H. SILVER.